United States Patent
Mori et al.

(10) Patent No.: US 7,372,235 B2
(45) Date of Patent: May 13, 2008

(54) CHARGING CONTROL CIRCUIT AND CHARGING DEVICE INCLUDING CHARGING TRANSISTOR CONTROL UNIT

(75) Inventors: Kiyoshi Mori, Kanagawa (JP); Manabu Okamoto, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 124 days.

(21) Appl. No.: 11/348,237

(22) Filed: Feb. 7, 2006

(65) Prior Publication Data

US 2006/0176025 A1 Aug. 10, 2006

(30) Foreign Application Priority Data

Feb. 9, 2005 (JP) ............................. 2005-032512

(51) Int. Cl.
*H01M 10/46* (2006.01)
(52) U.S. Cl. .................................... 320/125
(58) Field of Classification Search ................ 320/125, 320/137, 138, 160
See application file for complete search history.

(56) References Cited

U.S. PATENT DOCUMENTS

2005/0242777 A1* 11/2005 Van Beek et al. .......... 320/128

FOREIGN PATENT DOCUMENTS

JP 9-084276 3/1997

* cited by examiner

*Primary Examiner*—Edward H Tso
(74) *Attorney, Agent, or Firm*—McGinn IP Law Group, PLLC

(57) ABSTRACT

A charging control circuit according to an embodiment of the present invention includes a detecting circuit and a charging transistor control unit for controlling a charging transistor supplying a first current, a current source for supplying a second current, and a current source control unit for controlling the current source. For example, if a secondary battery is charged using an adaptor endowed with a current-limiting function, during a constant-current charging period in which a charging voltage of the secondary battery reaches 3.2 V to 4.2 V, the secondary battery is charged with the first current $I1$, and during a constant-voltage charging period after the voltage reaches 4.2 V, the secondary battery is charged with the first charging current and the second charging current.

20 Claims, 9 Drawing Sheets

US 7,372,235 B2

CHARGING CONTROL CIRCUIT AND CHARGING DEVICE INCLUDING CHARGING TRANSISTOR CONTROL UNIT

BACKGROUND OF THE INVENTION

1. Field of the Invention

The present invention relates to a charging control circuit for controlling an operation of charging a secondary battery of a cell phone, for example, and a charging device including the same. In particular, the invention relates to a charging control circuit and a charging device which reduce heat generated during charging.

2. Description of Related Art

General cell phones adopt a secondary battery (rechargeable battery) as a power supply. Referring to FIG. 7, a conventional charging device for charging a battery of a cell phone etc. is described. As shown in FIG. 7, a conventional charging device 101 includes a charging current supplying unit 110 for supplying a charging current to a secondary battery 111, and a charging control circuit 120 for controlling the charging current supplying unit 110. The charging current supplying unit 110 is composed of a charging transistor 112 connected with an adaptor voltage, a diode 114, a detection resistor 113, and the secondary battery 111, all of which are series-connected. A charging current I flowing through the charging transistor 112 is supplied to the secondary battery 111 to charge the secondary battery 111.

The charging control circuit 120 detects a potential difference (voltage) across the detection resistor 113 based on an amount of the charging current I supplied from the charging transistor 112 to the secondary battery 111, and controls the charging transistor 112 based on the detection result. That is, the charging control circuit 120 includes a detecting circuit 130 for detecting a voltage across the detection resistor 113, a control circuit 140 for outputting a control signal S1 in accordance with the detection result, and an operational amplifier 141 for controlling the charging transistor 112 in response to the control signal S1. The detecting circuit 130 includes an operational amplifier 131. The operational amplifier 131 has a negative terminal (inverting input terminal) connected with one end of the detection resistor 113 through an external contact 117 and a resistor 133. Further, a positive terminal (non-inverting input terminal) thereof is connected with the other end of the detection resistor 113 through an external contact 118 and a resistor 134. Furthermore, a feedback resistor 132 is connected between the negative terminal of the operational amplifier 131 and an output of the operational amplifier 131. The positive terminal thereof is connected with a grounded resistor 135. The charging control circuit 120 controls the charging transistor 112 to keep a voltage across the detection resistor at the same level.

Japanese Unexamined Patent Application Publication No. 9-84276 discloses a circuit for controlling an initial operation of charging such a secondary battery. A charging control circuit disclosed in this publication turns on a charging transistor for quickly charging the secondary battery in a short period, and after the battery was charged to the full, the circuit turns off the charging transistor and turns on a transistor smaller than the charging transistor. The smaller transistor is turned on to thereby continue a charging operation with a minute current not to overcharge the battery owing to the quick charging.

Incidentally, in recent years, devices using the secondary battery have been endowed with various functions. Along with such a tendency, there arises a need to increase a battery capacitance. To meet the need, an attempt has been made to increase a charging current for the purpose of shortening a charging period.

However, a larger amount of charging current causes a circuit supplied with the charging current to generate more heat. To overcome such a defect, some devices using the secondary battery have an adaptor (hereinafter, referred to as "current limiter-equipped adaptor") having a current limiting function for preventing a current from flowing beyond a specified limit on a current value to charge a battery. The current limiter-equipped adaptor has characteristics as shown in FIG. 8. As shown in FIG. 8, the current limiter-equipped adaptor lowers an adaptor voltage if a current flows beyond the upper limit on the current value. Such an adaptor is used to carry out a general charging process, that is, constant current-constant voltage charging, thereby suppressing heat generation during a constant-current charging period in which a large among of charging current is supplied for charging.

FIGS. 9A and 9B are schematic diagrams showing current and voltage characteristics relative to a charging period. As shown in FIG. 9A, the charging period is generally divided into a pre-charging period T1, a constant-current charging period T2, and a constant-voltage charging period T3. During the pre-charging period T1, the secondary battery is charged with a constant current $IS_1$ up to a predetermined voltage V1, for example, 3.2 V. During the constant-current charging period T2, the secondary battery is charged with a constant current $IS_2$ larger than the current $IS_1$ up to a predetermined voltage V2, for example, 4.2 V. During the constant-voltage charging period T3, after reaching the predetermined voltage V2, the secondary battery is charged with a charging current $IS_3$ that is controlled to keep the voltage V2 at the same level.

In this case, the adaptor voltage changes as shown in FIG. 9B. Assuming that the adaptor voltage is 5.5 V, for example, during the pre-charging period T1, the battery is charged with a relatively small current $IS_1$, so a voltage value Vadp thereof is kept at 5.5 V. During this period, the secondary battery is gradually charged up to the voltage V1. After the voltage level reached the voltage V1, the constant-current charging period T2 starts. During this constant-current charging period T2, if the charging current exceeds a predetermined current value, for example, as shown in FIG. 9B, the current limiter-equipped adaptor operates to lower the adaptor voltage Vadp.

Thus, during this period T2, an electric power represented by "(adaptor voltage Vadp−charging voltage Vb)×charging current" and applied to the charging transistor is lower than the case of the pre-charging period T1.

After the secondary battery was charged up to the voltage V2, the constant-voltage charging period T3 starts, and the charging current $IS_3$ is controlled to gradually reduce for maintaining "a secondary battery voltage Vb=V2".

If the charging current is increased to shorten a charging period, a generated heat quantity increases as mentioned above. As one measure therefore, the current limiter-equipped adaptor is used to suppress heat generation in this way. The applicants of the present invention have disclosed a charging control method and circuit capable of suppressing heat generation during a constant-current charging period, and a charging device including the same (Japanese Patent Application No. 2004-280845).

FIG. 9C is a schematic diagram showing a relation between a charging period and a current source temperature. If the secondary battery voltage reaches the predetermined voltage value V2, the charging control circuit starts charging (constant-voltage charging) with the secondary battery voltage kept at the voltage V2 (predetermined voltage). During the constant-voltage charging operation, the charging transistor is controlled to gradually reduce a charging current for charging the secondary battery. At this time, the connected adaptor increases its voltage value to the original value, 5.5 V, for example, in response to the reduction in charging current. Accordingly, a difference between the adaptor voltage Vadp and the charging voltage Vb of the secondary battery is largest at this point. That is, the electric power represented by "(adaptor voltage Vadp−charging voltage Vb)×charging current" and applied to the charging transistor reaches a peak just after the transition to the constant-voltage charging operation. An amount of heat generated from the charging transistor accordingly reaches a peak, and the charging transistor that is generally incorporated in a small package generates a large amount of heat. Therefore, it is desirable to suppress heat generation during not only the constant-current charging period but also the constant-voltage charging period.

SUMMARY OF THE INVENTION

A charging control circuit according to an aspect of the invention includes: a charging transistor control unit controlling a charging transistor for supplying a first current to a secondary battery; and a charging current supplying unit supplying a second current to the secondary battery, wherein when a constant-voltage charging operation starts, the secondary battery is charged with the first current and the second current from the charging current supplying unit as a charging current.

According to the charging control circuit of the present invention, during a constant-voltage charging period, the first current is supplied from an external charging transistor to the secondary battery, and in addition, the second current is supplied from the charging current supplying unit in the charging control circuit, whereby an amount of the first current can be reduced as compared with the case of charging the battery with a current from the charging transistor alone. That is, heat generation resulting from a charging current in the constant-voltage charging period can be dispersed and minimized.

A charging device according to another aspect of the invention includes: a charging transistor supplying a first current to a secondary battery; and a charging control circuit controlling the charging transistor, wherein the charging control circuit includes a charging current supplying unit for supplying a second current to the secondary battery, and when constant-voltage charging starts, the first current is supplied to the secondary battery, and the charging current supplying unit supplies the second current.

According to the charging device of the present invention, during the constant-voltage charging period, the secondary battery is charged with the first current from the charging transistor and the second current from the charging current supplying unit, whereby even during a constant-voltage charging period, the charging current is divided to the first current and the second current to disperse generated heat. This results in reduction in generated heat.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Hereinafter, embodiments of the present invention are described in detail with reference to the accompanying drawings. These embodiments are such that the present invention is applied to a charging control circuit and a charting device using the same, which can dissipate heat generated at the time of charting. The embodiments of the present invention describe a method of minimizing heat generation during each charging period for charting a secondary battery used in, for example, a cell phone, that is, a pre-charging period, a constant-current charging period, and a constant-voltage charging period.

As mentioned above, in general, a charging period for the secondary battery includes a constant-current charging period (T1, T2) for charging with a constant current, and a constant-voltage charging period T3 for charging with a constant voltage. The constant-current charging period includes a pre-charging period T1 for charging the battery with a current value $IS_1$ as small as 10 to 150 mA, for example, up to a predetermined voltage V1 of about 3 to 3.4 V, and a constant-current charging period (main charging period) T2 for charging the battery with a larger current value $IS_2$ up to a target voltage V2, for example, 4.2 V from the predetermined voltage value V1. A charging device according to a first embodiment of the present invention aims at suppressing heat generation during the constant-voltage charging period T3 out of these charging periods.

First Embodiment

Figure 1:
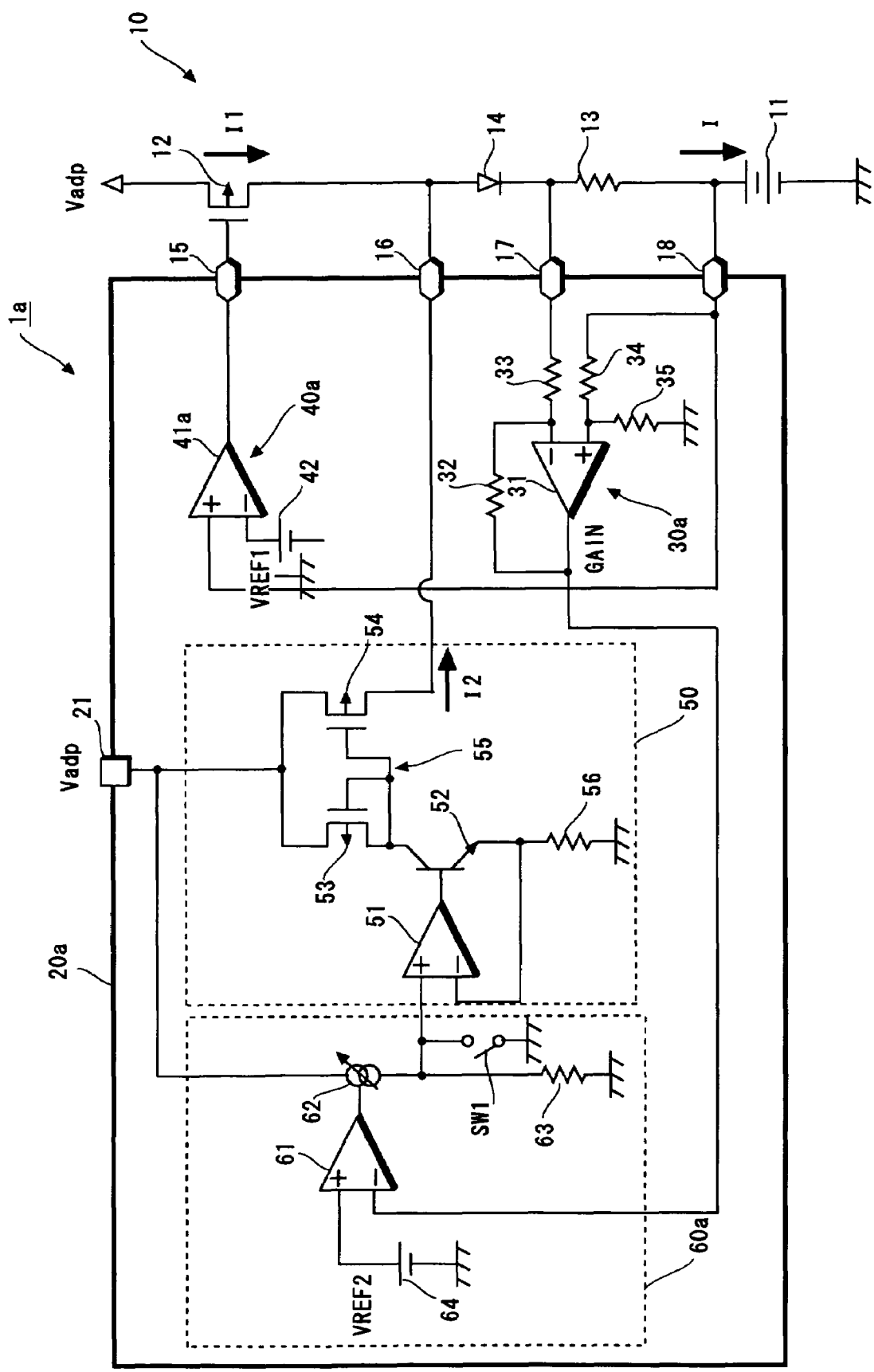
FIG. 1 shows a charging device according to a first embodiment of the present invention.

FIG. 1 shows the charging device according to the first embodiment of the present invention. A charging device 1a of this embodiment includes a first charging current supplying unit 10 for charging a secondary battery 11, and a charging control circuit 20a that controls the charging current supplying unit 10 and can charge the secondary battery 11.

The charging current supplying unit 10 includes a charging transistor 12 made up of a P-channel FET (field effect transistor) and series-connected with the secondary battery 11. The charging transistor 12 is connected with an adaptor voltage Vadp to supply a current I1 as a first current to the secondary battery 11. The charging current supplying unit 10 is supplied with a second current I2 from a charging control circuit 20a as mentioned below. The secondary battery 11 in the charging device 1a of this embodiment is supplied and charged with the current I1 as the charging current I during the constant-current charging period T2. The secondary battery 11 is supplied and charged with the current I1 and the current I2 as the charging current I during the constant-voltage charging period T3.

The charging current supplying unit 10 further includes a detection resistor 13 for detecting the charging current I, and a diode 14 for allowing a current to flow from the adaptor voltage to only the secondary battery 11.

The charging control circuit 20a is composed of a single IC, and includes a detecting circuit 30a, a charging transistor control unit 40a, a current source 50, and a current source control unit 60a. The detecting circuit 30a detects the charging current I based on a potential difference (voltage) across the detection resistor 13. The charging transistor control unit 40a controls the charging transistor 12 based on a detection result from the detecting circuit 30a. The current source 50 supplies the current I2 to the secondary battery 11. The current source control unit 60a controls the current I2 supplied from the current source 50 in accordance with the current I1. The current source 50 and the current source control unit 60a function as a charging current supplying unit for supplying a second current.

The charging control circuit 20a functions as a control circuit for controlling the charging transistor 12 of the charging current supplying unit 10 in the constant-current charging period T2 and the constant-voltage charging period T3, and functions as the charging current supplying unit for charging the secondary battery 11 in the constant-voltage charging period T3. Then, during the constant-voltage charging period T3, the charging control circuit 20a controls the current I1, and the secondary battery 11 is charged with the current I2. In the charging device where the charging current I is divided into the currents I1 and I2 to charge the battery using the current limiter-equipped adaptor in the constant-voltage charging period T3, an electric power applied to the charging transistor 12, which would increase just after the transition from the constant-current charging period T2 to the constant-voltage charging period T3 can be reduced to suppress heat generation.

In the description of this embodiment, during the constant-current charging periods T1 and T2, the secondary battery 11 is charged with the current I1 as the charging current I using the charging transistor 12. As mentioned below, however, needless to say, during the constant-current charging period T2, the secondary battery 11 may be charged with the currents I1, and I2. Further, if the pre-charging period T1 is set, even during the pre-charging period T1, the battery may be pre-charged with the currents I1 and I2.

Furthermore, this embodiment describes an example where a current limiter-equipped adaptor is connected with the charging device. However, even if such an adaptor is not used, the battery is charged with a charging current that is divided into the currents I1, and I2 during a part or all of the pre-charging period T1, the constant-current charging period T2, and the constant-voltage charging period T3, thereby suppressing heat generation of the charging transistor 12 and the entire charging device.

The detecting circuit 30a includes an operational amplifier 31 for outputting a signal based on a potential difference across the detection resistor 13. The operational amplifier 31 has a negative terminal (inverting input terminal) connected with a feedback resistor 32 connected with an output of the operational amplifier 31. Further, the negative terminal of the operational amplifier 31 is connected with one end of the detection resistor 13, and with a resistor 33 connected with an external contact 17. In addition, the operational amplifier 31 has a positive terminal (non-inverting input terminal) connected with a grounded resistor 35 and with a resistor 34. The resistor 34 is connected with the other end of the detection resistor 13 via an external contact 18.

The detecting circuit 30a detects a potential difference across the detection resistor 13 based on the charging current I flowing through the detection resistor 13 (=first current I1+second current I2), and sends a detection result according to the potential difference to the charging transistor control unit 40a.

The charging transistor control unit 40a includes an operational amplifier 41a for controlling the charging transistor 12 based on a voltage value (charging voltage) of the secondary battery 11. The operational amplifier 41a has a positive terminal connected with an external contact 18 to keep the charging voltage of the secondary battery 11. In addition, the negative terminal is connected with a grounded power supply 42 to keep a reference voltage VREF1. The reference voltage VREF1 is the voltage V2, for example, 4.2 V at which the constant-voltage charging operation starts. The charging transistor control unit 40a outputs a signal (control signal) to the charging transistor 12 through a external contact 15 corresponding to a potential difference between a charging voltage Vb of the secondary battery 11 and the reference voltage VREF1 toward a gate of the charging transistor 12 via the external contact 15. Thus, the charging transistor control unit 40a controls the current I1 flowing through the charging transistor 12 such that the charging voltage Vb of the secondary battery 11 is equal to the reference voltage VREF1.

Further, the charging control circuit 20a includes a power supply terminal 21 that is connected and supplied with the adaptor voltage Vadp. The charging control circuit 20a includes an adaptor detecting circuit (not shown), and when the adaptor detecting circuit detects that the adaptor voltage is connected, the charging control circuit 20a starts a charging operation for the secondary battery 11 as described below.

The current source 50 includes an operational amplifier 51 a positive terminal of which receives a signal (control signal) output from the current source control unit 60a, and includes a transistor 52 having a base connected with an output of the operational amplifier 51. The transistor 52 has a corrector connected with a current-mirror circuit 55 that is composed of transistors 53 and 54 and connected with the adaptor voltage at one end. An emitter of the transistor 52 is connected with a grounded resistor 56. In the current source 50, the transistor 52 is turned on in response to a control signal from the current source control unit 60a. Then, the current I2 flows from the current-mirror circuit 55 to the charging current supplying unit 10 via an external contact 16. The external contact 16 is connected with a node between the charging transistor 12 and the diode 14. Accordingly, the current I2 is supplied to the charging current supplying unit 10 and then combined with the current I1 supplied from the charging transistor 12 to flow through the diode 14 and the detection resistor 13 together with the current I1 into the secondary battery 11.

The current source control unit 60a further includes an operational amplifier 61, a variable-current circuit 62, and a resistor 63. The operational amplifier 61 has a positive terminal connected with a power supply 64 for supplying a reference voltage VREF2, and has a negative terminal connected with an output of the current detecting circuit 30a. The variable-current circuit 62 generates a current based on the output voltage of the operational amplifier 61. The resistor 63 is connected between the variable-current circuit 62 and a ground potential. The reference voltage VREF2 satisfies the following equation:

Reference voltage VREF2=resistor $R0 \times$ current value $IS_2 \times$ GAIN where the resistor R0 represents a resistance value of the resistor 13, the current value $IS_2$ represents a value of the charging current I in the constant-current charging period T2, for example, 500 mA, and GAIN represents a gain of the operational amplifier 31.

A switch SW1 is provided in parallel to the resistor 63, and is turned on/off under the control in accordance with a value of the charging voltage Vb for the secondary battery 11. The switch SW1 is kept ON until the charging voltage Vb reaches a voltage value V2 (for example, 4.2 V) at which constant-current charging starts. The positive terminal of the operational amplifier 51 is grounded, and the switch is turned off at a timing when the charging voltage Vb of the secondary battery 11 equals the voltage V2, that is, at a timing when the constant-current charging period T2 is shifted to the constant-voltage charging period T3 to connect the positive terminal of the operational amplifier 51 and the variable-current circuit 62. The operational amplifier 61, the variable-current circuit 62, and the resistor 63 control an amount of the current I2 based on the charging current I.

With such a configuration, during the constant-current charging period T2, that is, a period necessary for the charging voltage Vb of the secondary battery 11 to reach the voltage V2, the secondary battery 11 is supplied with a predetermined amount of current I1 as the charging current I. Then, during the constant-voltage charging period T3 in which the secondary battery 11 is charged with the charging voltage Vb kept at the voltage V2, the current I1 and the current I2 are supplied as the charging current I under the control.

Next, a charging operation of the charging device 1a of this embodiment is described. First, when the adaptor is connected and the adaptor voltage Vadp is supplied to the charging device, the operational amplifier 41a outputs a signal corresponding to whether or not a charging voltage is lower than the voltage V1 (for example, 3.2 V) at which the constant-current charging operation for the secondary battery 11 starts or whether or not the charging voltage is voltage V2 (for example, 4.2 V) lower than the voltage V2 (for example, 4.2 V) at which the constant-voltage charging operation starts. For example, if the charging voltage is lower than the voltage V2, the charging transistor 12 is turned on to start the constant-current charging. Turning on the charging transistor 12 causes the current I1 to flow. Here, during the pre-charging period T1, and the constant-current charging period (main charging period) T2, the switch SW1 is turned on, and the current source 50 does not supply the current I2.

Figure 9A:
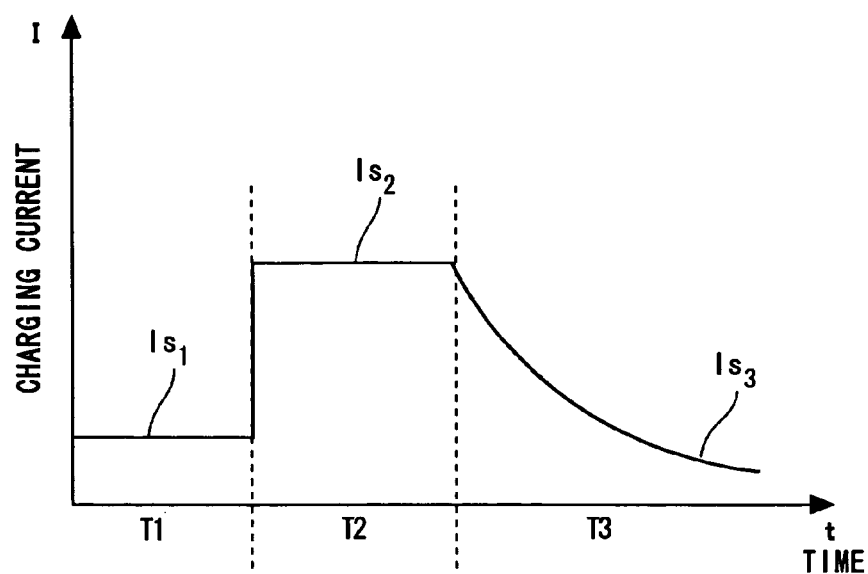
FIGS. 9A to 9C are schematic diagrams showing a current, a voltage, and temperature characteristics with respect to the time of a charging operation.
Figure 9B:
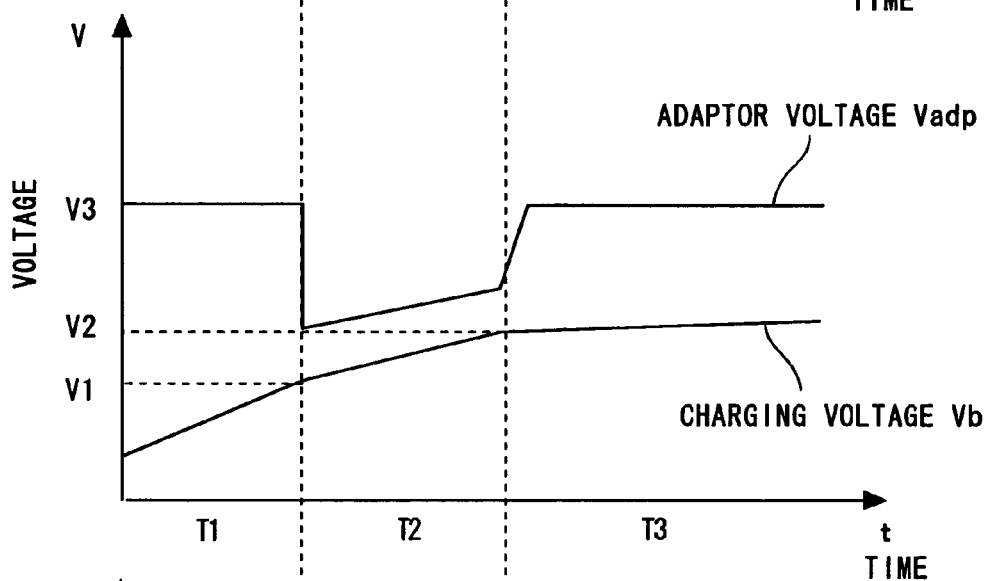
Figure 9C:
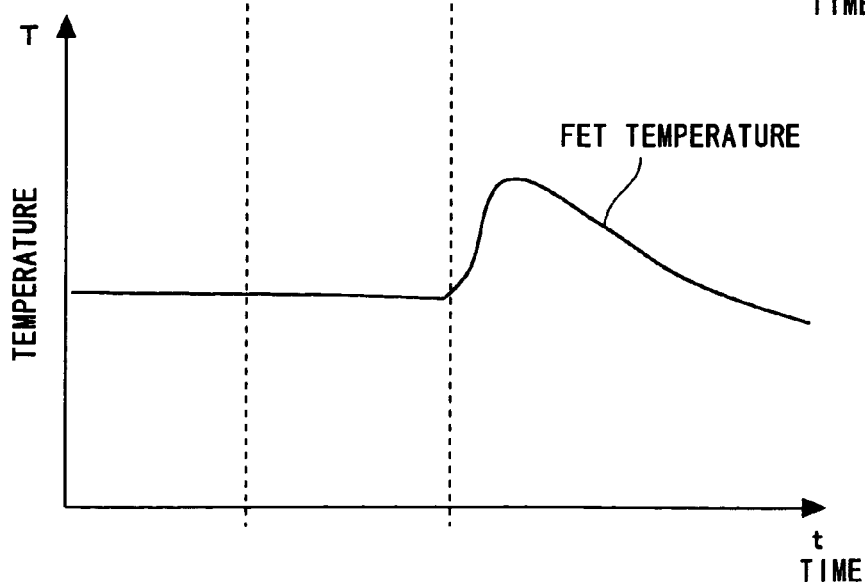

In the constant-current charging period T2 (see FIG. 9B) as a period necessary for the charging voltage Vb to reach the predetermined voltage V2, the charging current I1 as the charging is more than that in the pre-charging period, and the adaptor lowers the voltage Vadp owing to its current-limiting function. An electric power to the charging transistor 12 represented by "(adaptor voltage Vadp−charging voltage Vb)×current I1" is lower than the case of supplying a voltage with a fixed voltage value (for example, 5.5 V) of the adaptor in the pre-charging period T1 since the adaptor voltage Vadp is lowered. Hence, the heat generation in the charging transistor I1 is suppressed.

Next, the charging voltage Vb of the secondary battery 11 reaches the predetermined voltage V2 to start the constant-voltage charging operation. First, when the charging voltage Vb=V2, the switch SW1 it turned off. The switch SW1 being turned off, the operational amplifier 61 controls the variable-current circuit 62 based on an output value of the operational amplifier 31, whereby the current source 50 supplies the current I2. The current I2 from the current source 50 is combined with the current I1 and then supplied to the secondary battery 11 as the charging current I. Incidentally, the variable-current circuit 62 supplies a smaller amount of current in accordance with a larger potential difference between input terminals of the operational amplifier 61, that is, a larger potential difference between an output voltage of the operational amplifier 31 and the reference voltage VREF. The charging current I is controlled to keep the charging voltage Vb constant during the constant-voltage charging period T3 (see FIG. 9A). In the constant-current charging period T2, the current I1 flowing through the charging transistor 12 is the charging current I, while in the constant-voltage charging period T3, the current I1 flowing through the charging transistor 12 equals "charging current I−current I2" because of the current I2 from the charging control circuit 20a. Thus, it is possible to reduce the current I1 flowing through the charging transistor 12 only by means of the charging transistor 12 as compared with a conventional method of charging a secondary battery.

Once the constant-voltage charging operation starts, a gate voltage of the charging transistor 12 gradually increases, and the current I1 is accordingly reduced little by little. The reduction in current I1 leads to a reduction in charging current I, so the potential difference between the input terminals of the operational amplifier 61 becomes large. As a result, an amount of current from the variable-current circuit 62 is reduced, and the current I2 from the current source 50 is reduced. As mentioned above, a current value of the current I1 and current I2 becomes smaller, so the adaptor voltage Vadp returns to the original voltage value (for example, 5.5 V). Although a difference between the adaptor voltage Vadp and the charging voltage Vb increases, the charging current I is supplied also from the current source 50, so the charging transistor 12 has only to supply a smaller amount of current I1. That is, some of the current I included by "(adaptor voltage Vadp−charging voltage Vb)×current I" is diverted as the current I2 from the charging control circuit 20a, whereby the electric power supplied to the charging transistor 12 is minimized, making it possible to suppress heat generation.

In the charging device 1a of this embodiment, during the constant-voltage charging period T3, the current I1 and the current I2 are reduced at the same rate. As mentioned below, it is possible to cause the current I1 to reduce ahead of the start of the constant-voltage charging period T3 by supplying the current I2, or to cause the current I1 and the current I2 to reduce in the constant-voltage charging period T3 at the rates of decrease corresponding to, for example, the heat releasing properties of the charging control circuit 20a and the charging transistor 12. In other words, the rate of decrease of the current I1 flowing through the charging transistor 12 may be set higher than that of the current I2 from the charging control circuit 20a superior in heat releasing property. This makes it possible to further suppress the heat generation of the charging transistor 12 inferior in heat releasing property.

As mentioned above, in this embodiment, upon the transition to the constant-voltage charging operation that generates the largest amount of heat, the current I2 is supplied from the current source 50 provided in the charging control circuit 20a to reduce the current I1 from the charging transistor 12, with the result that heat generation of the charging transistor can be suppressed. Further, the charging control circuit 20 is made up of one IC, and its package size is larger than that of the charging transistor 12. Therefore, the charging control circuit 20 is superior in heat releasing property, so even if the current source 50 is provided in the charging control circuit 20a to supply the current I2, the total amount of generated heat is small. Especially in the case of using the current limiter-equipped adaptor, although a problem of heat generated upon the transition to the constant-voltage charging operation is increasingly serious, even in such a case, the charging current I is supplied from plural sources to effectively suppress heat generation.

Second Embodiment

Next, a second embodiment of the present invention is described. In the above first embodiment, during the constant-voltage charging period, the charging current I is divided into the current I1, and the current I2 to minimize the heat generation of the charging device, while in this embodiment, even during the pre-charging period, and the constant-current charging period, the battery is charged with the current I2 from the current source 50 of the charging control circuit 20a.

Figure 2:
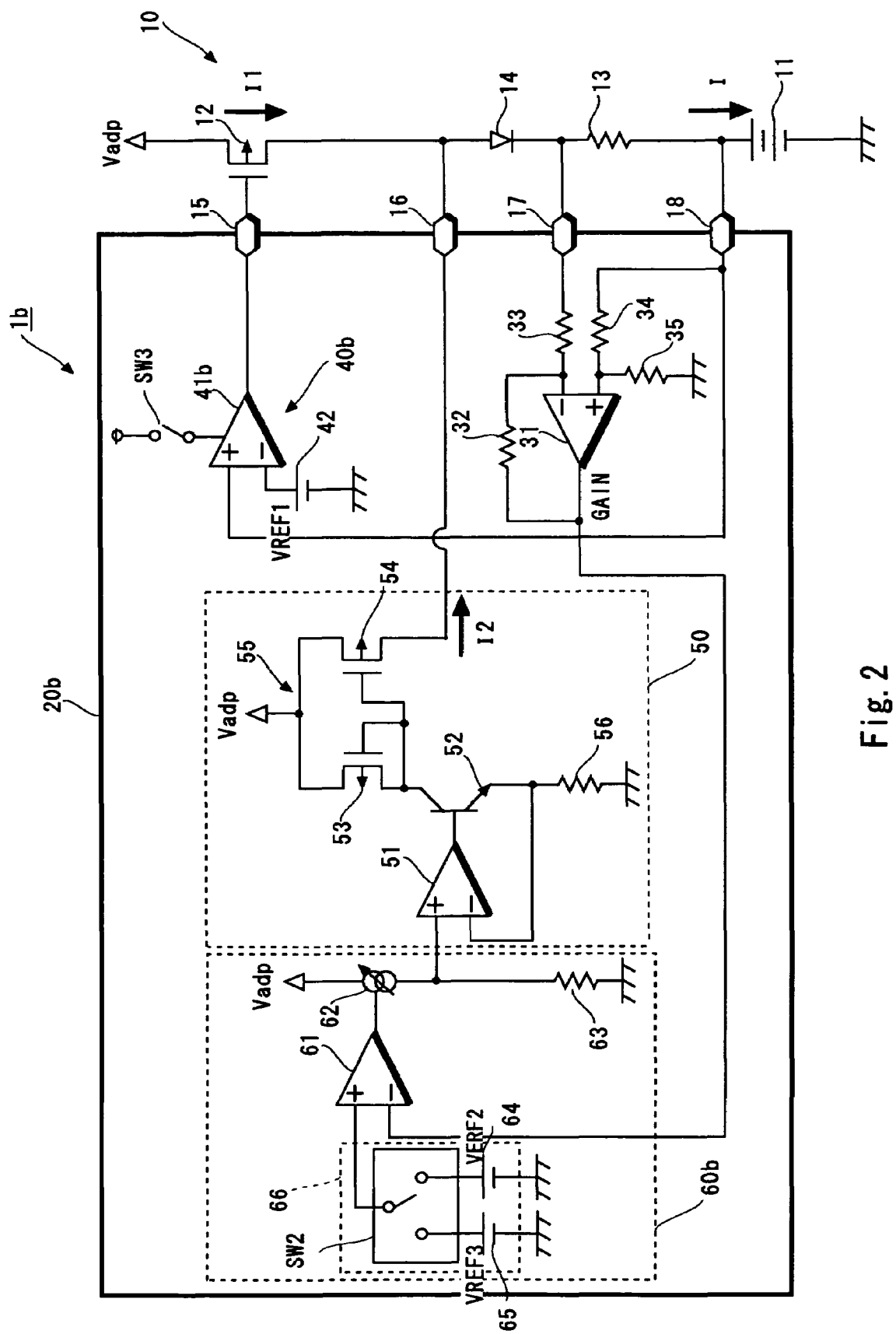
FIG. 2 is a circuit diagram showing a charging device according to a second embodiment of the present invention.

FIG. 2 is a circuit diagram showing a charging device 1b of this embodiment. In the second embodiment of FIG. 2, and a third embodiment of FIG. 5 as mentioned below, the same components as those of the first embodiment of FIG. 1 are denoted by like reference numerals, and their detailed description is omitted.

As shown in FIG. 2, a charging device 1b of this embodiment includes a switch SW2 in place of the switch SW1 of the first embodiment, which is used for starting control over the current source 50 upon the shift from the constant-current charging operation to the constant-voltage charging operation. That is, a current source control unit 60b of this embodiment includes a voltage source 66 which has the power supply 64, a power supply 65, and the switch SW2. The voltage source 66 supplies a reference voltage VREF2 or VREF3 to a positive terminal of the operational amplifier 61.

The power supply 65 supplies the reference voltage VREF3, and the power supply 64 supplies the reference voltage VREF2 as mentioned above. The switch SW2 detects the charging voltage Vb of the secondary battery 11 via, for example, the external contact 18 to switchingly apply the reference voltage VREF2 or VREF3 to the positive terminal of the operational amplifier 61 based on the charging voltage Vb. Here, the reference voltage VREF2 satisfies the following equation:

Reference voltage VREF2=resistor $R0$×current value $IS_1$×GAIN where the resistor $R0$ represents a resistance value of the resistor 13, GAIN represents a gain of the operational amplifier 31, and the current value $IS_1$ represents a value of the charging current I in the pre-charging period T1, which is smaller than the aforementioned current value $IS_2$.

Further, a switch SW3 for turning on/off operational amplifier 41b is connected with the operational amplifier 41b of the charging transistor control unit 40b. The switch SW3 detects the charging voltage Vb of the secondary battery 11 via, for example, the external contact 18 to execute on/off control of the operational amplifier 41b based on the charging voltage Vb.

Here, in this embodiment, during the pre-charging period T1, the battery is not charged with the current from the charging transistor 12, but is charged with only the current I2 from the current source 50 of the charging control circuit 20b. During the constant-current charging period T2, and the constant-voltage charging period T3, the battery is charged with the charging current I that is divided into the current I1 from the charging transistor 12 and the current I2 from the charging control circuit 20b.

Therefore, the switch SW2 is selectively switched to the power supply 65 until the end of the pre-charging period T1, tat is, until the charging voltage Vb of the secondary battery 11 equals the voltage value V1 (for example, 3.2 V) in the constant-current charging period T2. Hence, the voltage VREF3 is applied to the positive terminal of the operational amplifier 61 to control the current source 50 so as to supply the current I2 (=$IS_1$).

In addition, the switch SW3 keeps the operational amplifier 41b OFF until the charging voltage Vb equals the voltage value V2 (for example, 4.2 V), and turns on the operational amplifier 41b upon the transition to the constant-current charging period T2. The constant current I1 is thereby supplied from the charging transistor 12 to the secondary battery 11. At the same time, the switch SW2 is switched to the power supply 64, then the voltage VREF2 is applied to the positive terminal of the operational amplifier 61. The current source 50 is controlled to supply the constant current I2 so as to keep the charging current I constant.

Figure 3A:
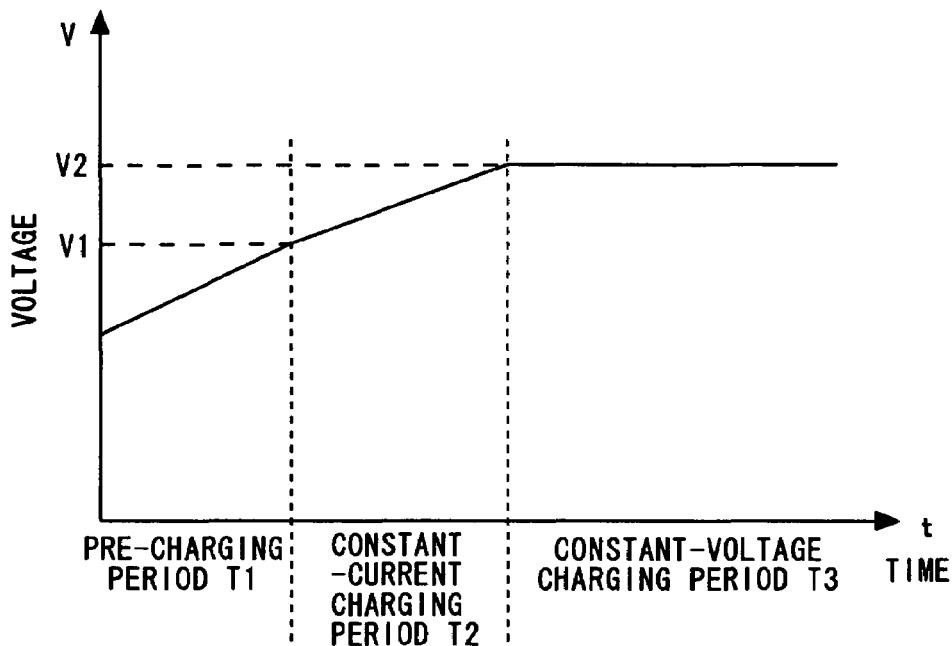
FIG. 3A is a graph showing a relation between the time and a charging voltage Vb from a pre-charging period to a constant-voltage charging period.

Next, an operation of this embodiment is described. FIG. 3A is a graph showing a relation between the time and a charging voltage Vb from a pre-charging period to a constant-voltage charging period, and FIG. 3B is a graph showing a relation between the time and the charging current I from the pre-charging period to the constant-voltage charging period.

Figure 3B:
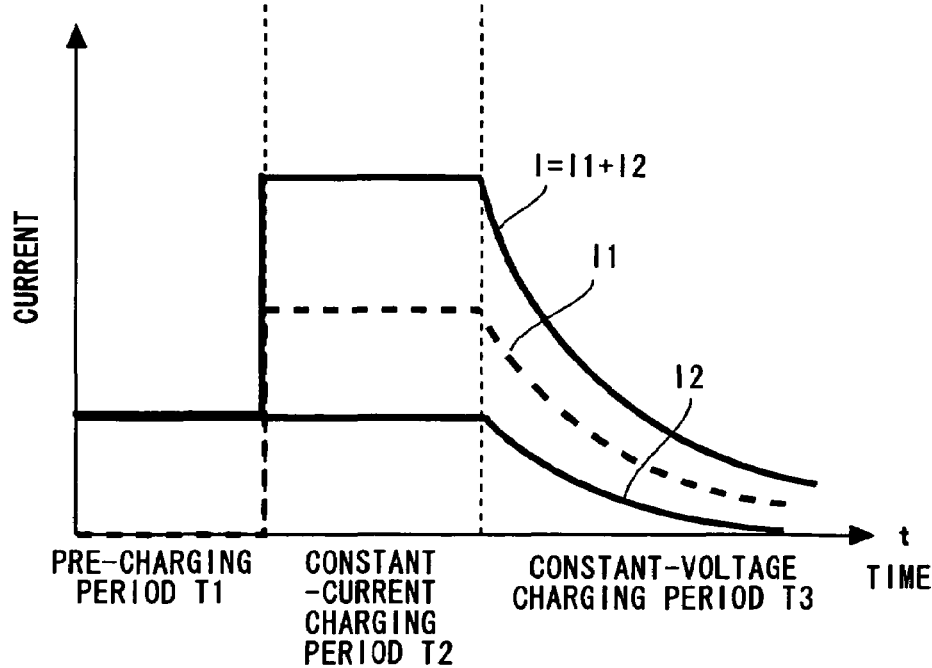
FIG. 3B is a graph showing a relation between the time and a charging current I from a pre-charging period to a constant-voltage charging period.

First, during the pre-charging period T1 as a period necessary for the charging voltage of the secondary battery 11 to reach the voltage V1, the switch SW3 is turned off, so as shown in FIG. 3B, the current I1=0. During the pre-charging period T1, the voltage source 66 applies the reference voltage VREF3, and the current source control unit 60b outputs a control signal to cause the current source 50 to supply the current I2 (=$IS_1$(=I)).

Next, when the secondary battery 11 voltage reaches the voltage V1, a charging process is shifted to the constant-current charging period T2. In this case, the switch SW3 is turned on to start the operation of the operational amplifier 41b and cause the current I1 to flow through the charging transistor 12. Along with this, the switch SW2 is switched, and the voltage source 66 applies the reference voltage VREF2, and then the current source control unit 60b controls the current source 50 to supply a current represented by "charging current I−current I2". Thus, until the charging voltage Vb reaches the predetermined voltage V2 (for example, 4.2 V), the constant-current charging operation in which the charging current I is kept constant is performed. The operational amplifier 41b outputs a control signal corresponding to a potential difference between the charging voltage Vb of the secondary battery 11 and the voltage VREF1 to control the charging transistor 12. Moreover, the variable-current circuit 62 generates current based on a potential difference between the control signal generated by the operational amplifier 31 in accordance with the potential difference across the resistor 13, and the current source 50 supplies the current I2 corresponding to the generated current. Once the charging voltage Vb increases up to the predetermined voltage V2, the charging process is shifted to the constant-voltage charging period T3. The operation of the charging device 1b in the constant-voltage charging period T3 is the same as that of the foregoing charging device 1a.

In this embodiment, in the illustrated example of FIG. 3B, the current I2 in the constant-current charging period T2 is set equal to a current $IS_1$ in the pre-charging period, and is smaller than the current I1. However, the current I2 in the constant-current charging period T2 may be set larger than the current I1 flowing through the charging transistor 12. As described above, if the charging control circuit is superior in heat releasing property to the package of the charging transistor 12, the current I2 amount is set larger than the current I1 amount, whereby heat generation of the charging transistor 12 can be suppressed.

In this embodiment, during the pre-charging period T1, the battery is charged with the current I2 from the charging control circuit 20b, and even during the constant-current charging period T2, the charging current I is supplied from plural sources as in the constant-voltage charging period T3 to reduce an amount of current supplied from the charging transistor 12 and suppress heat generation throughout the charging period.

In this embodiment, during the pre-charging period T1, the current I2 from the charging control circuit 20b is utilized, but pre-charging may be effected with the current I1 from the charging transistor 12 by executing on/off control of the switch SW3 as appropriate. If necessary, even during the pre-charging period, the charging current I may be divided in to the current I1 and the current I2 to charge the battery.

Figure 4:
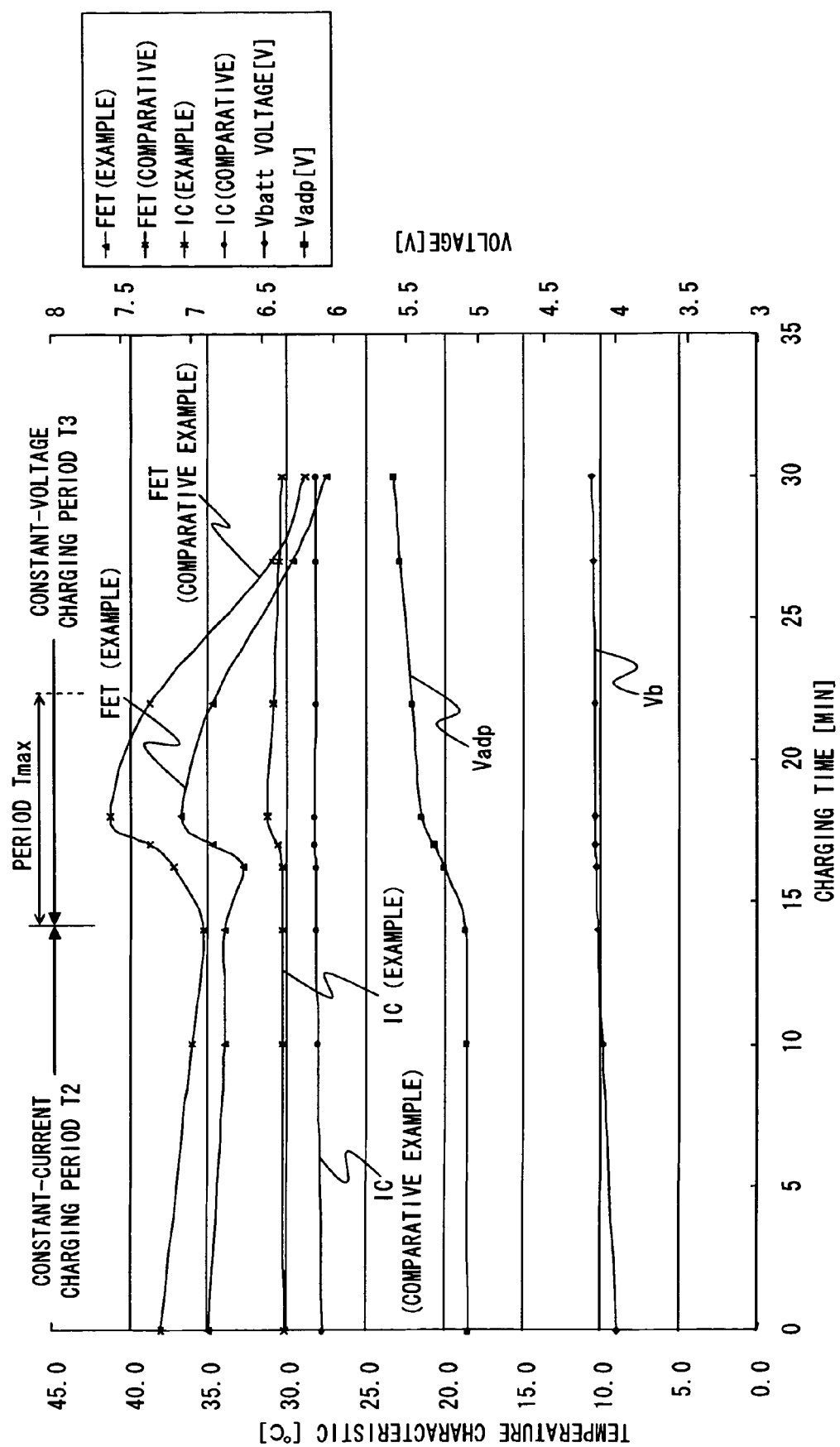
FIG. 4 is a graph showing temperature characteristics based on charging control according to the second embodiment of the present invention.

Next, a beneficial effect of this embodiment is described. FIG. 4 is a graph showing temperature characteristics based on charging control according to the second embodiment of the present invention. In FIG. 4, a FET (example) shows a temperature change of the transistor 12 of this embodiment, and an IC (example) shows a temperature change of the charging control circuit 20b of this embodiment. FIG. 4 also shows temperature changes of the charging transistor and the charging control circuit in the case where the secondary battery is charged only with the charging transistor as a FET (comparative example) and an IC (comparative example). In FIG. 4, the charging period including the constant-current charging period T2 and the constant-voltage charging period T3 except the pre-charging period T1 are only illustrated.

As apparent from FIG. 4, the charging process is shifted from the constant-current charging to the constant-voltage charging about 14 minutes after the start of charging operation. During a period Tmax following the constant-voltage charging period (from 15 to 20 minutes in the constant-voltage charging period T3), the charging current I is reduced, and the adaptor voltage Vadp accordingly increases. In this period, a high voltage is applied to the charging transistor 12 (FET (example)) and the FET (comparative example)), so the surface temperature is highest. Here, during the constant-voltage charging period T3, in the example, a charging operation with the current I2 from the charging control circuit (IC (example)) is also started, so a temperature of a charging control circuit (IC (example)) slightly increases, but the surface temperature of the charging transistor of this example (FET (example)) is lower than the surface temperature of the charging transistor (FET (comparative example)) of the comparative example by about 5° C.

Third Embodiment

Next, a third embodiment of the present invention is described. In this embodiment, the charging voltage is monitored to control the current I1 flowing through the charging transistor 12. Prior to the transition to the constant-voltage charging period T3 involving the largest amount of generated heat, a value of the current I1 is set small beforehand to allow the current I1 to flow through the charging transistor 12, making it possible to further reduce heat generation of the charging transistor 12.

Figure 5:
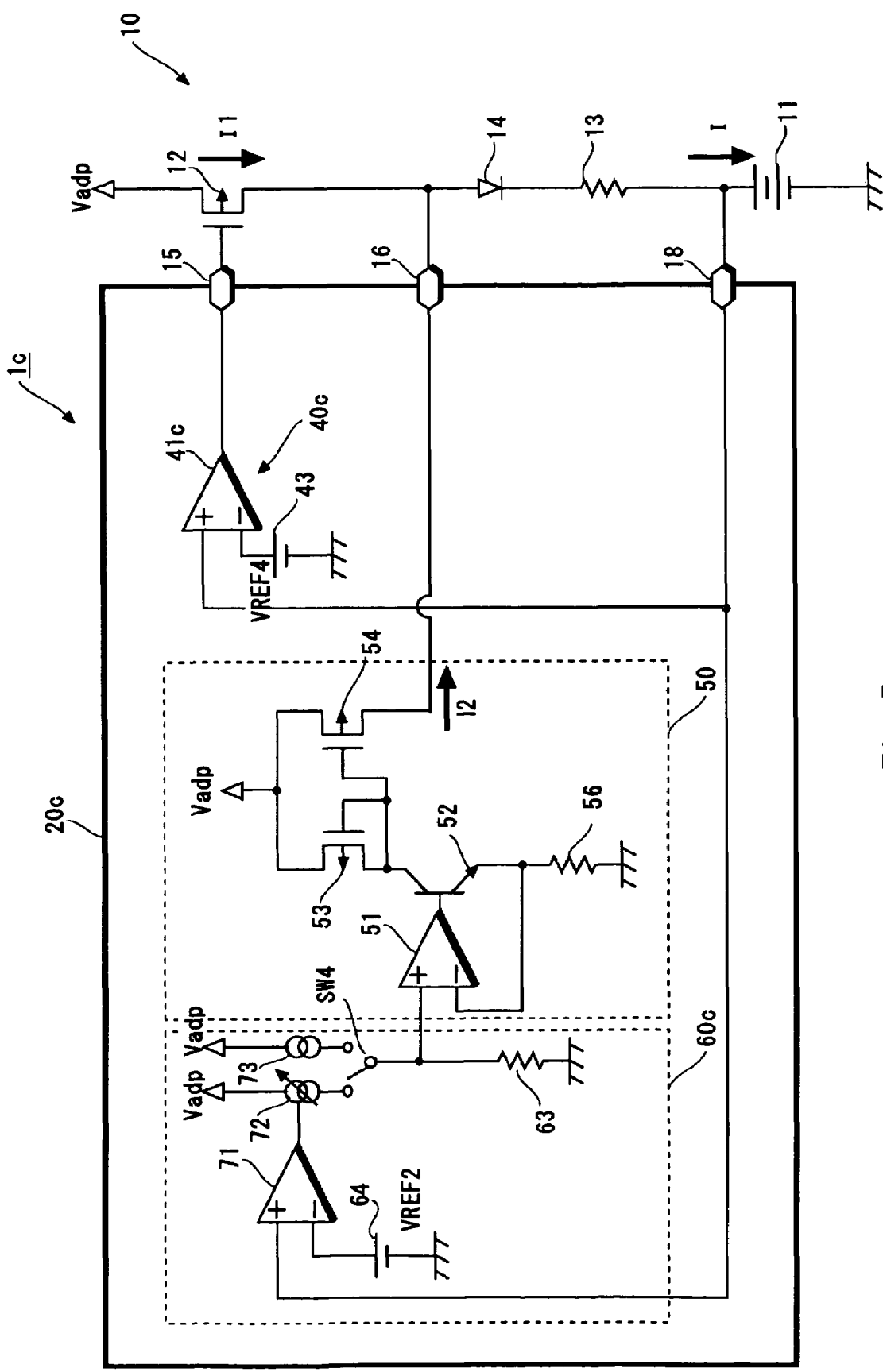
FIG. 5 is a circuit diagram showing a charging device according to a third embodiment of the present invention.
Figure 6A:
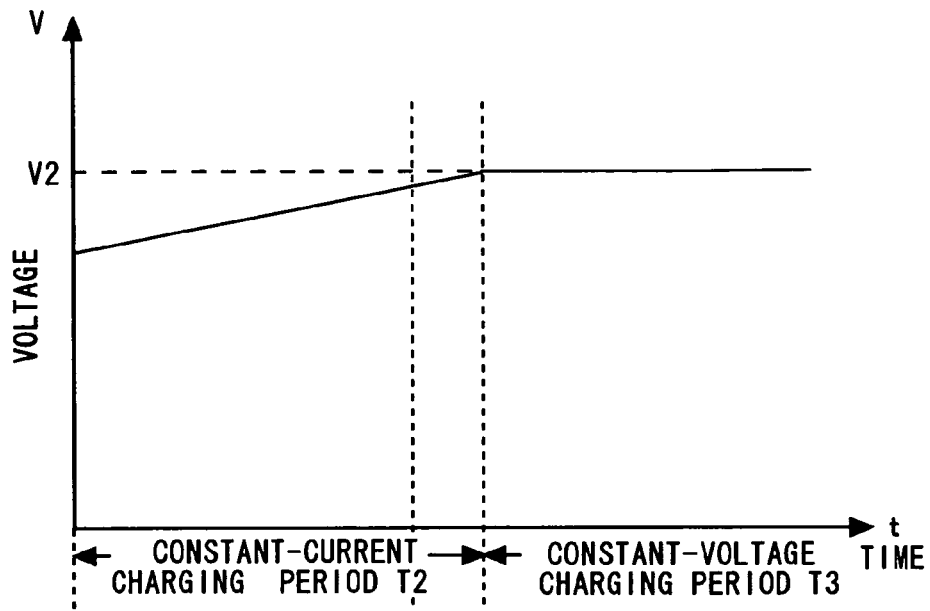
FIG. 6A is a schematic diagram showing a relation between a charging period and a charging voltage upon charging a secondary battery of the charging device of FIG. 5.
Figure 6B:
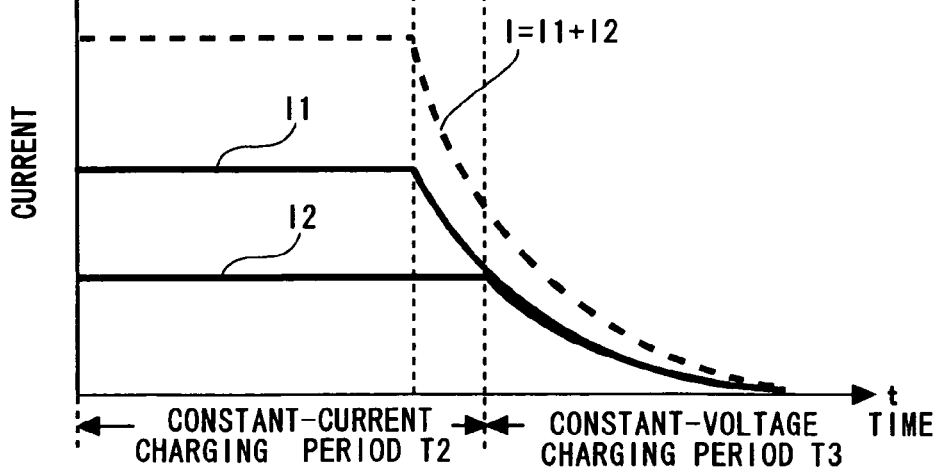
FIG. 6B is a schematic diagram showing a relation among the charging period, a current I1, a current I2, and the charging current I.
Figure 7:
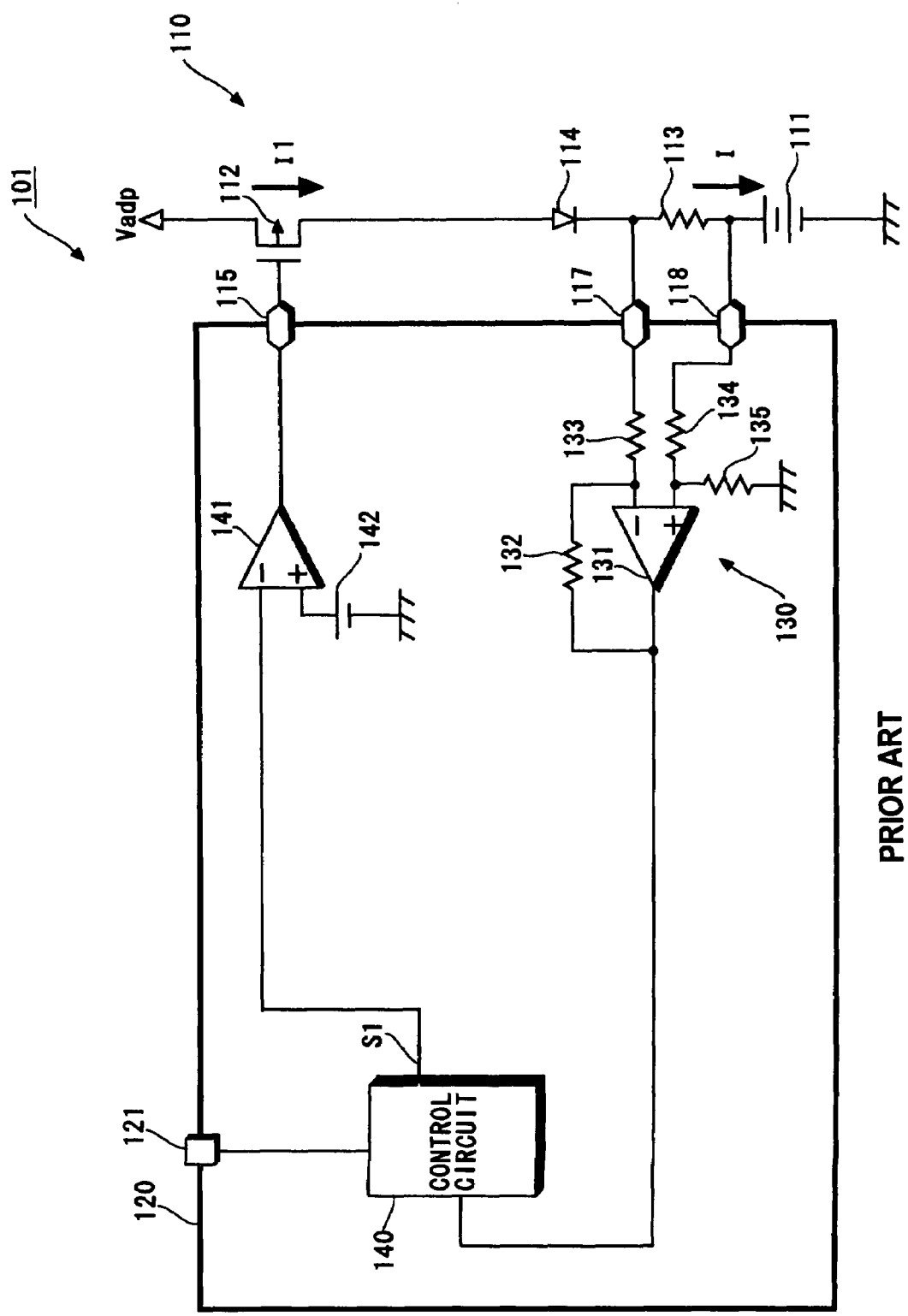
FIG. 7 shows a conventional charging device.
Figure 8:
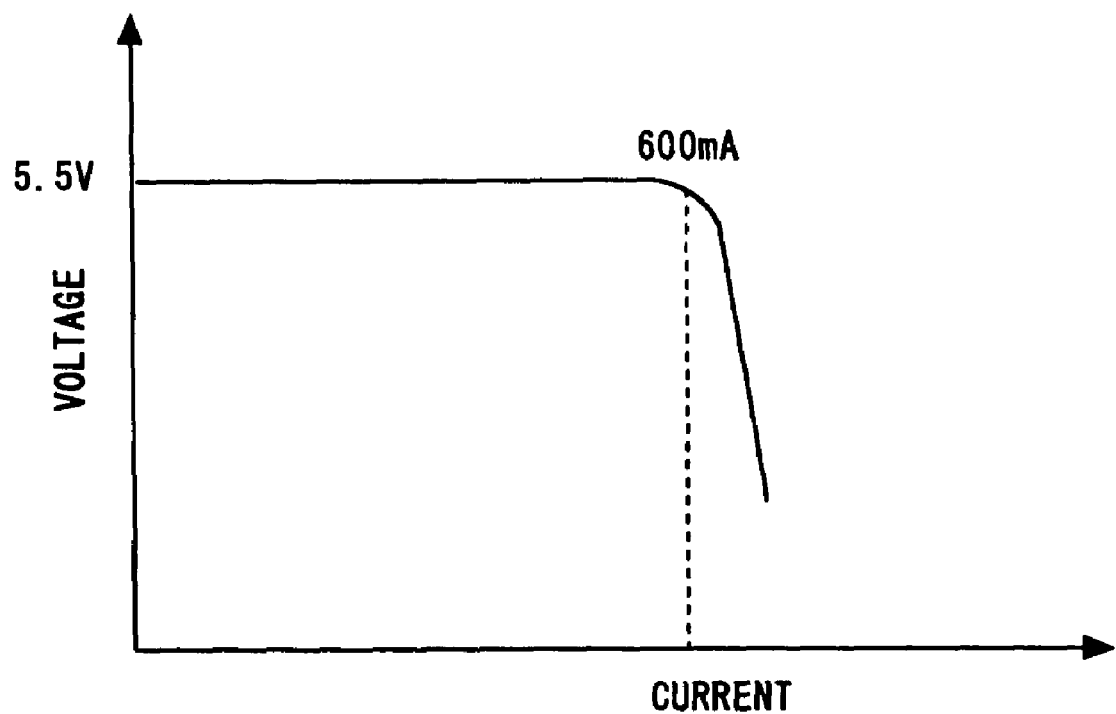
FIG. 8 shows characteristics of a current limiter-equipped adaptor.

FIG. 5 is a circuit diagram showing a charging device according to this embodiment. FIG. 6A is a schematic diagram showing a relation between a charging period and a charging voltage upon charging the secondary battery of the charging device of this embodiment, and FIG. 6B is a schematic diagram showing a relation among the charging period, the current I1, the current I2, and the charging current I.

A charging control circuit 20c of a charging device 1c of this embodiment includes a charging transistor control unit 40c for controlling the charging transistor 12 based on a potential difference between the charging voltage Vb supplied through the external contact 18 and the power supply 43, and a current source control unit 60c for controlling the current source 50 based on a potential difference between the charging voltage Vb supplied through the external contact 18 and the power supply 64.

The charging transistor control unit 40c includes an operational amplifier 41c for controlling the charging transistor, and a power supply 43 for supplying a reference voltage VREF4 to a negative input terminal of the operational amplifier. The operational amplifier 41c has the positive terminal applied with the charging voltage Vb like the operational amplifier 41a of FIG. 1 and the negative terminal applied with not the reference voltage VREF1 but the reference voltage VREF4. The reference voltage VREF1 is set such that the charging voltage Vb upon the constant-voltage charging equals the predetermined voltage V2, while the reference voltage VREF4 is set lower than the predetermined voltage V2. For example, if the predetermined voltage V2=4.2 V, the reference voltage VREF4=4.19 V.

Further, this embodiment dispenses with the current detecting circuit 30a of FIG. 1. Further, the current source control unit 60c includes an operational amplifier 71 in place of the operational amplifier 61 of the current source control unit 60a of FIG. 1. The operational amplifier 71 has a negative terminal connected with the power supply 64 apply the voltage VREF2 equals the predetermined voltage V2, and its positive terminal is applied with the charging voltage Vb. Moreover, a variable-current circuit 72 that functions to supply a larger amount of current in accordance with a larger potential difference between the input terminals of the operational amplifier 71 is provided instead of using the variable-current circuit 62 of FIG. 1. Further, the operational amplifier 51 has a positive terminal connected with the variable-current circuit 72, or the constant current source 73 through the switch SW4. The other components are the same as those of the first embodiment shown in FIG. 1.

Next, an operation of the charging device according to this embodiment is described. The control over the charging transistor 12 is the same as that in FIG. 1. That is, during the constant-current charging period T2, the secondary battery 11 is charged with the constant current I1 until the charging voltage Vb reaches the voltage VREF4.

Further, during the constant-current charging period T2, the switch SW4 is switched to connect between the positive terminal of the operational amplifier 51 and the constant current source 73, and the current source 50 supplies the constant current I2 in accordance with the constant current source 73. A gate voltage of the charging transistor 12 increases when the secondary battery 11 voltage reaches a voltage set as the voltage VREF4 to reduce the current I1. Further, if the secondary battery 11 voltage reaches the voltage VREF2 (4.2 V), the switch SW4 is switched to connect the positive terminal of the operational amplifier 51 and the variable-current circuit 72, and the operational amplifier 71 gradually reduces a supply amount of current I2 to keep the secondary battery 11 voltage at 4.2 V. At this time, the voltage VREF4 is set lower than the voltage VREF2, whereby the current I1 from the charging transistor 12 can reduce in advance of reducing the current I2 from the charging control circuit 20c. In this way, the current I1 supplied from the charging transistor 12 inferior in heat releasing property is reduced prior to the current I2, so the heat generated just after the transition to the constant-voltage charging period Tmax can be further suppressed. That is, the period Tmax for the charging transistor 12 can be set ahead of the transition to the constant-voltage charging period T3. The charging control circuit 20c generates a little heat during the period Tmax although incorporated into a package of a heat releasing property higher than the charging transistor 12. Thus, during this period Tmax as well, the charging current is divided using the charging transistor 12 and the charging control circuit 20c to further reduce the total amount of generated heat.

The present invention is not limited exclusively to the aforementioned embodiments, and needless to say, the invention allows various modifications within the scope of the present invention. For example, in the charging device connected with the current limiter-equipped adaptor, upon the transition to the constant-voltage charging, the charging current I may be divided into the current I1 and the current I2 only during the predetermined period Tmax in which a heat quantity temporarily increases. That is, as shown in FIG. 4, after the elapse of the predetermined period Tmax following the transition to the constant-voltage charging period, an amount of heat generated from the charging transistor reduces in parallel to a reduction in charging current I. Therefore, during at least the predetermined period Tmax following the transition to the constant-voltage charging period where a larger amount of heat is generated, the charging current I is divided into the current I1, and the current I2 to disperse heat generated from the whole charging device and heat generated from the charging transistor 12.

Further, during the constant-voltage charging period T3, the battery may be charged only with the current I2 from the charging control circuit. If the current limiter-equipped adaptor is used to charge the secondary battery 11, a problem of heat generated upon the transition to the constant-voltage charging operation is increasingly serious. However, even if the charging current I is not divided, as compared with the case of supplying the charging current I to the charging transistor 12, the current I2 from the charging control circuit of a higher heat releasing propriety is used for charging, so the heat generation of the charging device can be suppressed. In this case, during the constant-current charging period, if the charging current I is divided into the current I1 and the current I2, the heat generation in the constant-current charging period can be dispersed.

It is apparent that the present invention is not limited to the above embodiment that may be modified and changed without departing from the scope and spirit of the invention.

What is claimed is:

1. A charging control circuit, comprising:
 a charging transistor control unit controlling a charging transistor for supplying a first current to a secondary battery; and
 a charging current supplying unit supplying a second current to the secondary battery,
 wherein when a constant-voltage charging operation starts, the secondary battery is charged with the first current and the second current from the charging current supplying unit as a charging current.

2. The charging control circuit according to claim 1, wherein the charging current supplying unit includes:
 a current source for supplying the second current; and
 a current source control unit for controlling the current source, and
 the current source control unit controls the current source such that a ratio between the second current and the first current is constant.

3. The charging control circuit according to claim 1, wherein the secondary battery is charged by use of an adaptor endowed with a current-limiting function.

4. The charging control circuit according to claim 2, wherein at least one of the charging transistor control unit and the current source control unit is shifted to a constant-current charging mode for charging the secondary battery with a constant current in a constant-current charging period and to a constant-voltage charging mode for charging the secondary battery with a constant charging voltage in a constant-voltage charging period.

5. The charging control circuit according to claim 4, wherein the charging transistor control unit and the current source control unit execute control such that the charging transistor and the current source supply the first current and the second current as the charging current to the secondary battery during the constant-current charging period.

6. The charging control circuit according to claim 4, wherein at least one of the charging transistor control unit and the current source control unit is shifted to a pre-charging mode in which the secondary battery is charged with a charging current lower than the constant current during a pre-charging period ahead of the constant-current charging period.

7. The charging control circuit according to claim 4, wherein the current source control unit controls the current source to supply the second current as the charging current to the secondary battery during the pre-charging period.

8. The charging control circuit according to claim 4, wherein the constant-current charging period is a period necessary for the charging voltage of the secondary battery to increase from a first voltage to a second voltage, and the constant-voltage charging period is a period in which the charging voltage is kept at the second voltage, the charging transistor control unit is in the constant-current charging mode during the constant-current charging period, and the secondary battery is charged with the first current until the charging voltage reaches the second voltage, and the charging transistor control unit and the current source control unit are shifted to the constant-voltage charging mode at a timing when the charging voltage reaches the second voltage to charge the secondary battery with the first current and the second current.

9. The charging control circuit according to claim 4, wherein the constant-current charging period is a period necessary for the charging voltage of the secondary battery to increase from a first voltage to a second voltage, and the constant-voltage charging period is a period in which the charging voltage is kept at the second voltage, the current source control unit is in the constant-current charging mode during the constant-current charging period, and the secondary battery is charged with the first current until the charging voltage reaches the second voltage, and the charging transistor control unit is turned on the charging transistor at a timing when the charging voltage reaches the second voltage, and is shifted to the constant-voltage charging mode together with the current source control unit to charge the secondary battery with the first current and the second current.

10. The charging control circuit according to claim 9, wherein the secondary battery is charged by use of an adaptor endowed with a current-limiting function.

11. The charging control circuit according to claim 4, wherein the constant-current charging period is a period necessary for the charging voltage of the secondary battery to increase from a first voltage to a second voltage, and the constant-voltage charging period is a period in which the charging voltage is kept at the second voltage, the charging transistor control unit and the current source control unit are shifted to the constant-voltage charging mode at a timing when the charging voltage reaches the first voltage to charge the secondary battery with the first current and the second current, the current source control unit is shifted to the constant-voltage charging mode at a timing when the charging voltage reaches the second voltage to charge the secondary battery with the second current, and the charging transistor control unit is shifted to the constant-voltage charging mode prior to the current source control unit to charge the secondary battery with the first current.

12. The charging control circuit according to claim 4, wherein the pre-charging period is a period necessary for the charging voltage of the secondary battery to reach the first voltage, the constant-current charging period is a period necessary for the charging voltage to increase from the first voltage to the second voltage, and the constant-voltage charging period is a period in which the charging voltage of the secondary battery is kept at the second voltage, the current source control unit is in the pre-charging mode until the charging voltage reaches the first voltage, and is shifted to the constant-current charging mode at a timing when the charging voltage reaches the first voltage, and the charging transistor control unit is turned on the charging transistor at a timing when the charging voltage reaches the second voltage, and is shifted to the constant-voltage charging mode together with the current source control unit.

13. The charging control circuit according to claim 4, wherein the secondary battery is charged by use of an adaptor endowed with a current-limiting function.

14. The charging control circuit according to claim 5, wherein the secondary battery is charged by use of an adaptor endowed with a current-limiting function.

15. The charging control circuit according to claim 6, wherein the secondary battery is charged by use of an adaptor endowed with a current-limiting function.

16. The charging control circuit according to claim 7, wherein the secondary battery is charged by use of an adaptor endowed with a current-limiting function.

17. The charging control circuit according to claim 8, wherein the secondary battery is charged by use of an adaptor endowed with a current-limiting function.

18. A charging device, comprising:

a charging transistor supplying a first current to a secondary battery; and a charging control circuit controlling the charging transistor, wherein the charging control circuit includes a charging current supplying unit for supplying a second current to the secondary battery, and when constant-voltage charging starts, the first current is supplied to the secondary battery, and the charging current supplying unit supplies the second current.

19. The charging device according to claim 12, wherein the charging control circuit has a heat resistance lower than a heat resistance of the charging transistor.

20. The charging device according to claim 12, wherein the secondary battery is charged by use of an adaptor endowed with a current-limiting function.

* * * * *